United States Patent [19]
Duecker et al.

[11] Patent Number: 5,673,649
[45] Date of Patent: Oct. 7, 1997

[54] EGG ESCALATOR

[75] Inventors: Donald D. Duecker, Taylorville; Shawn Damery; Charles L. Jordan, both of Assumption, all of Ill.

[73] Assignee: The GSI Group, Inc., Assumption, Ill.

[21] Appl. No.: 503,653

[22] Filed: Jul. 18, 1995

[51] Int. Cl.[6] ................................................. A01K 43/00
[52] U.S. Cl. .................................. 119/337; 198/699.1
[58] Field of Search ................................ 119/327, 337, 119/338; 198/699.1

[56] References Cited

U.S. PATENT DOCUMENTS

| | | | |
|---|---|---|---|
| 3,002,494 | 10/1961 | Murray | 119/337 |
| 3,033,162 | 5/1962 | Bailey | 119/337 |
| 3,282,393 | 11/1966 | Graves et al. | |
| 3,626,905 | 12/1971 | Giesbert et al. | 119/337 |
| 3,650,246 | 3/1972 | Fowler et al. | 119/337 |
| 3,656,794 | 4/1972 | McCord | 294/64.1 |
| 3,743,079 | 7/1973 | Siciliano | 198/698 |
| 4,036,355 | 7/1977 | Valli | 198/699.1 |
| 4,079,845 | 3/1978 | Warren | 414/796.3 |
| 4,226,211 | 10/1980 | Barrentine | 119/337 |
| 4,355,936 | 10/1982 | Thomas et al. | 414/796.2 |
| 4,416,219 | 11/1983 | Dill | 119/337 |
| 4,488,637 | 12/1984 | Loeffler | 198/803.9 |
| 4,505,373 | 3/1985 | Thomas | 198/432 |
| 4,519,494 | 5/1985 | McEvoy et al. | 198/448 |
| 5,167,317 | 12/1992 | Van Der Schoot et al. | 198/699.1 |

OTHER PUBLICATIONS

Brochure: Cage Systems for Poultry by Chore-Time*.
Brochure: Modern Technology for Egg Handling & Transport by Hellman Poultry*.
Brochure: Valli Model descriptions of Valli International SRL*.

*Primary Examiner*—Robert P. Swiatek
*Assistant Examiner*—Elizabeth Shaw
*Attorney, Agent, or Firm*—Polster, Lieder, Woodruff & Lucchesi

[57] ABSTRACT

An egg escalator (23) of the present invention transfers eggs from one level (L1) to another level (L2) and it comprises a first conveyor (25) having an upper reach (27) inclined at an angle and extending between the one level (L1) to the other level (L2). Eggs (E) rest on the upper reach of the first conveyor as they are conveyed from the one level to the other level. A second belt (29) is spaced generally above the upper reach of the first belt, and the second belt has a lower reach (31) spaced from the upper reach (27) of the first belt disposed so as to be substantially parallel to the upper reach of the first belt. The second belt has a multiplicity of elongate, flexible fingers (33) extending perpendicularly therefrom. The fingers are spaced at substantially equal intervals from one another along the second belt for accommodating an egg (E) between adjacent fingers. The lower reach of the second belt is spaced relative to the upper reach of the first belt such that the ends of the fingers belt are in close proximity to the upper reach of the first belt on which the eggs are supported. The upper reach of the first belt and the lower reach of the second belt are driven in the same direction at substantially the same surface speed such that the upper reach moves the eggs from the one level to the other level, the fingers on the second belt inhibit the eggs from rolling down the upper reach of the first belt.

16 Claims, 4 Drawing Sheets

EGG ESCALATOR

BACKGROUND OF THE INVENTION

This invention relates to an inclined conveyor for moving eggs from one level to another, and, as such, is oftentimes referred to as an egg escalator.

In modern poultry egg laying operations, hens are often housed either in cages in which they are fed and in which they lay eggs, or, in a breeder operation, the hens are free to roam within a poultry house and have mechanical nests available to them in which the hens lay eggs. In either cage or mechanical nest systems, the eggs roll by gravity from the nest or cage onto a horizontal conveyor which collects the eggs. This conveyor conveys the eggs in horizontal direction to the end of a row or cages or nests at which point the eggs are conveyed from the poultry house.

In many commercial egg laying installations there will be several banks of tiered cages or nests arranged in long rows with each tier in each bank of cages or nests having its own horizontal egg collection belt. A single horizontal cross conveyor will be provided for collecting all of the eggs in all of the rows of cages or nests in the bank. Thus, it is necessary to convey the eggs from the different levels of the tiered cages or nests so that all of the eggs can be collected by the common egg collection conveyor. Of course, the eggs conveyed by the cross conveyors may be transferred to other conveyors for transporting the eggs to sorting and grading areas.

In breeder operations, it is particularly important to protect the eggs from cracking. If an egg is cracked and if it is not detected in a subsequent inspection, the cracked egg may, during the incubation process, undergo a mild explosion which can spread the contents of the cracked egg onto adjoining eggs in the incubation tray thus damaging all of the eggs in the tray. It is therefor very important in breeding egg laying operations to protect the eggs from cracking as they are collected and sorted.

Still further, in many breeder egg laying operations, it is highly desirable for the eggs to be delivered by the conveying system onto a sorting or grading table having a convenient working height for the person using the table. However, in retrofitting a new cage or nesting system in an existing poultry house, oftentimes the level of the conveyor system delivering the eggs to the egg collection table was at a height that either required that the table be located in a pit such that the table would be at the correct working height. These pits required that a substantial amount of construction need be carried out on the poultry house at considerable expense. Further, the requirement of these pits made for uncomfortable working conditions for the person working on the table and made for possible unsanitary conditions because the pits were difficult to properly clean.

Heretofore, several different egg escalators were known. Reference may be made to U.S. Pat. No. 4,036,355 which describes an egg escalator having an endless belt extending between two conveyors on different level with the conveyor having elongate, resilient fingers which extend from the surface of the escalator belt for gripping eggs therebetween as the eggs are transferred from one level to another with a stationary wall extending adjacent the ends to the fingers between the levels through which the eggs are to be transported so as to hold the eggs between the fingers and to prevent the eggs from falling out of the fingers. Such fingered belts which grip the eggs may either be disposed in a vertical or an inclined position.

Reference may also be made to U.S. Pat. No. 4,226,211 which shows an egg conveying belt having an inclined belt which has spaced, elongate resilient fingers extending therefrom for preventing eggs carried on the belt from rolling down the inclined sections of the belt.

U.S. Pat. No. 3,743,079 illustrates another egg escalator belt having elongate resilient foam fingers extending outwardly from an endless belt. A lower conveyor belt is provided upon which the eggs are carried as they are moved from one level to an other. The lower conveyor and the upper belt having the foam fingers are inclined and the upper belt is spaced from the lower belt a distance less than the diameter of an egg between the ends of the foam fingers and the upper surface of the lower belt. As the eggs are conveyed onto the upper surface of the lower belt, the foam fingers of the upper belt engage the eggs and the fingers are compressed by the eggs thereby to hold the eggs on the lower belt as they are conveyed from one level to another. However, the foam fingers exert a compressive force on the eggs which can lead to undue cracking of the eggs.

As shown in U.S. Pat. Nos. 3,656,794, 4,079,845, 4,355, 936 and 4,553,661, egg escalator systems are known in which the eggs are gripped by means of vacuum gripping heads which are then raised or lowered to left the eggs from one level to another.

U.S. Pat. Nos. 4,488,637 and 4,505,373 describe egg carriers which mechanically grip the eggs to permit them to be lifted from one level to another.

U.S. Pat. No. 4,519,494 describes an egg handling system in which eggs are conveyed on horizontal conveyors at different levels. A rotatable, resilient cylindrical brush receives the eggs from one conveyor and holds them against a curved stationary plate while the brush lifts the eggs to the other conveyor at the other level.

U.S. Pat. No. 3,282,393 shows a pair of cross conveyors at the same level with a rotatable brush element having elongate brush elements extending therefrom which is driven about an axis parallel to the direction of the conveyor bearing the incoming eggs such as to receive the eggs of this first conveyor and to move them laterally off the first conveyor onto the second intersecting conveyor.

U.S. Pat. No. 3,626,905 illustrates an endless conveyor having U-shaped egg carriers which receive an egg from an conveyor or the like at one level by having the egg deposited in the open mouth of the U-shaped carriers. The U-shaped carriers are mounted on an endless belt which is entrained around upper and lower sprocket wheels with a vertical reach between the sprocket wheels. In order to convey the eggs from an upper level to a lower level, the eggs are loaded onto the U-shaped carriers as the latter move upwardly past the end of the upper conveyor. As the carriers move around the upper sprocket, the eggs in the carriers roll from the sides to the base of the U-shaped carriers and as the belt move down the other reach, the eggs are carried on the other side of the U-shaped shaped carriers. Of course, the eggs are free to roll out of the carriers and the belt is entrained around the lower sprocket so as to deposit the eggs onto another conveyor.

Other egg lifting or escalators systems are known in which, for example, the eggs are transported on a rod or bar conveyor where the rods are spaced apart a distance less than the diameter of the eggs such that when the conveyor encounters an inclined section, the eggs are prevented by the rods from rolling down the incline.

While the above-discussed egg escalator and egg conveying systems worked well for their respective intended applications, there have been long-standing problems. Certain of the prior egg escalators have had a problem because with unduly high egg breakage or cracking. This may be caused by grippers which mechanically grip the eggs, or due to the moving eggs encountering a movable belt at a substantially different elevation or stationary structure along the path of the eggs. In addition, certain of the egg escalators, such at the above-described rod conveyors, limit the slope of inclination of the elevator section to a maximum slope such that the eggs will not roll off the inclined section. Others of the prior art egg escalators can operate only in a nearly vertical position. These limits on the degree of inclination have placed undue constraints on the design and installation of egg conveying systems, especially where a more modern egg conveying system is to be installed in conjunction with previously installed cages or nests that were not specifically designed for use with the egg conveying system to be retro-fitted for use therewith.

There has also been a problem in synchronizing the surface speed of the various conveyor belts and the egg escalator such that there is a smooth transition of the eggs from the horizontal belt to the escalator and from the escalator to the other belt so as to minimize the likelihood of egg breakage or cracking.

SUMMARY OF THE INVENTION

Among the several objects and features of the present invention may be noted the provision of an egg escalator which transfers eggs from one horizontal level to another in a speedy and uniform manner so as to substantially eliminate egg breakage;

The provision of such an egg escalator in which the eggs are conveyed to and from the escalator by means of horizontal conveyors with the eggs being conveyed on the egg escalator at substantially the same surface speed as the horizontal conveyors;

The provision of such an egg escalator in which the eggs are supported by a conveyor belt as they are raised or lowered by the escalator and in which the eggs are prevented from rolling down the conveyor belt;

The provision of such an egg escalator which may be readily adjusted to a desired degree of inclination within a range of inclinations such that the escalator may readily accommodate a range of conveyors at different levels;

The provision of such an egg escalator for use with an infeed conveyor and an outfeed conveyor with the infeed and outfeed conveyors being of different elevations where the same belt is used for the egg conveying reaches of the infeed, escalator, and outfeed conveyors thereby to insure a smooth and uniform transfer of the eggs from the infeed to the escalator conveyor and from the escalator conveyor to the outfeed conveyor;

The provision of such an egg escalator in which adjustments of the conveyor belt may readily be accommodated so as to maintain a proper tension on the belt;

The provision of such an egg escalator in which a common belt is used for the egg collection conveyor, the egg escalator conveyor, and the egg delivery conveyor with the common belt being driven by a single drive thereby to insure synchronization of the belts, particularly upon changing the speed of the drive;

The provision of such an egg escalator which may be used so as to allow eggs to be delivered to a sorting or collection table at a desired work height regardless of the elevation of the egg conveyor supplying eggs to the table; and The provision of such an egg escalator which is of rugged and economical construction, which works in harmony with existing egg collection systems, and which does not require major modifications to poultry houses for use therein.

Briefly stated, an egg escalator transfers eggs from one level to another level and it comprises a first conveyor belt having an upper reach inclined at an angle and extending between the one level to the other level. The eggs rest on the upper reach of the first conveyor belt as they are conveyed from the one level to the other level. A second belt is spaced generally above the upper reach of the first belt, and the second belt has a lower reach spaced from the upper reach of the first belt and disposed so as to be substantially parallel to the upper reach of the first belt. The second belt has a multiplicity of elongate, flexible fingers extending perpendicularly therefrom. The fingers are spaced at substantially equal intervals from one another along the second belt for accommodating an egg between adjacent fingers. The lower reach of the second belt is spaced relative to the upper reach of the first belt such that the ends of the fingers belt are in close proximity to the upper reach of the fist belt on which the eggs are supported. The upper reach of the first belt and the lower reach of the second belt are driven in the same direction at substantially the same surface speed such that as the upper reach moves the eggs from the one level to the other level, the fingers on the second belt inhibit the eggs from rolling down the upper reach of the first belt.

Other objects and features of this invention will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
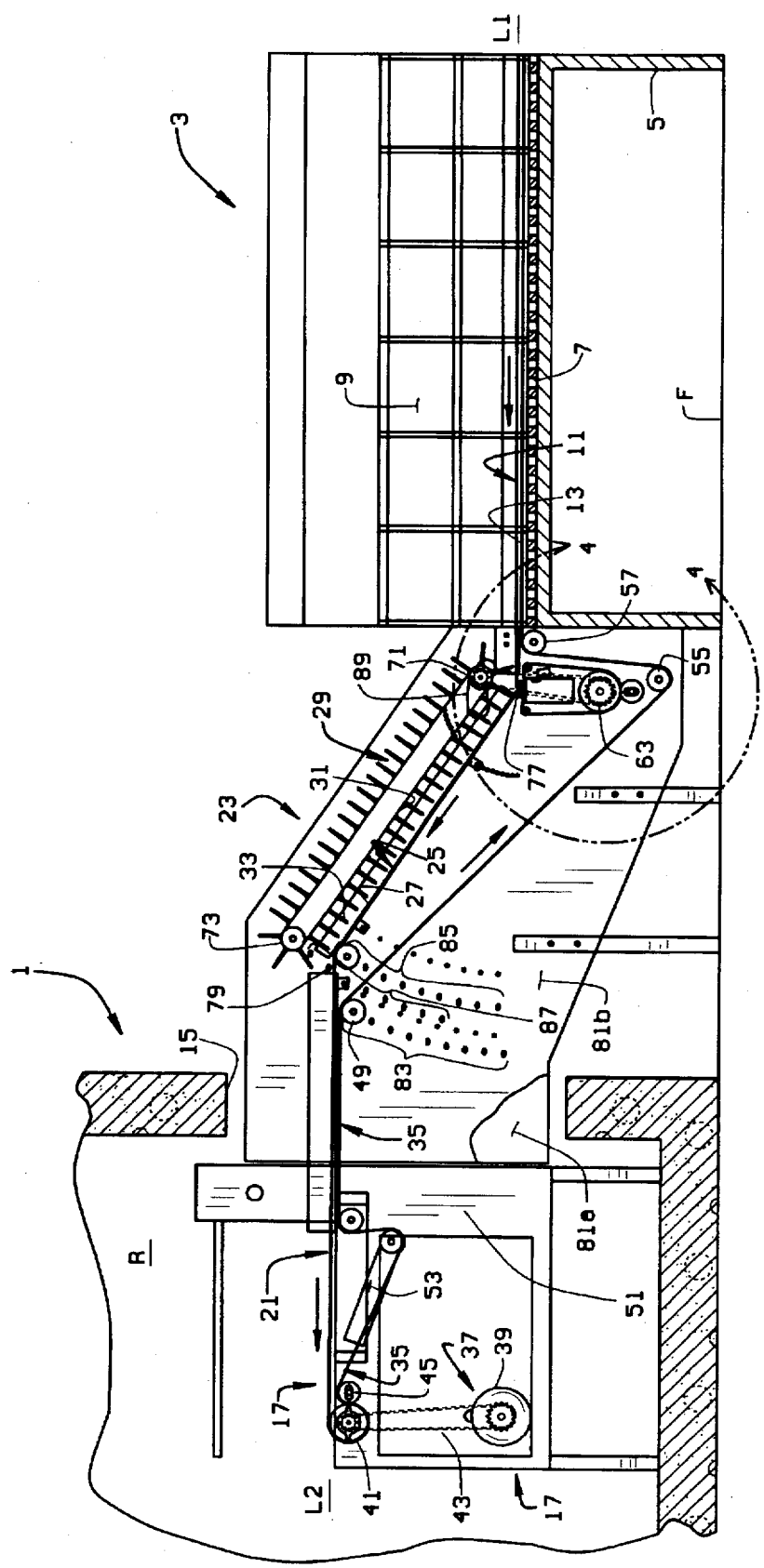
FIG. 1 is a side elevational view of a portion of a poultry breeding house having a mechanical nesting system therein in which hens lay eggs with the eggs being collected by a conveyor belt for being conveyed to an egg collection table located outside the poultry house with an egg escalator of the present invention transferring the eggs on the conveyor belt from one level to another such that the collection table may be adjusted to a convenient working height.

Referring now to the drawings and particularly to FIG. 1, a poultry house or the like is indicated in its entirety by reference character 1. The particular poultry house shown is known as a breeder house in which hens are bred to produce fertilized eggs E which are incubated at a hatchery to produce chicks. Poultry house 1 has nests 3 therein in which the hens lay their eggs. These nests are supported on nest supports 5 above the level of floor F of the poultry house. Slats 7 are provided on the front of the nests to assist the hens in entering and exiting the nests. As shown, nests 3 have multiple nest holes 9 therein in which the hens may lay their eggs. As is conventional, when a hen lays an egg in a nest hole 9, the egg rolls out of the nest and onto an egg collection conveyor 11 located between rows of nests. At certain times of the day, the egg collection conveyor is operated so as to convey the eggs from the nesting area within the poultry house.

Figure 2:
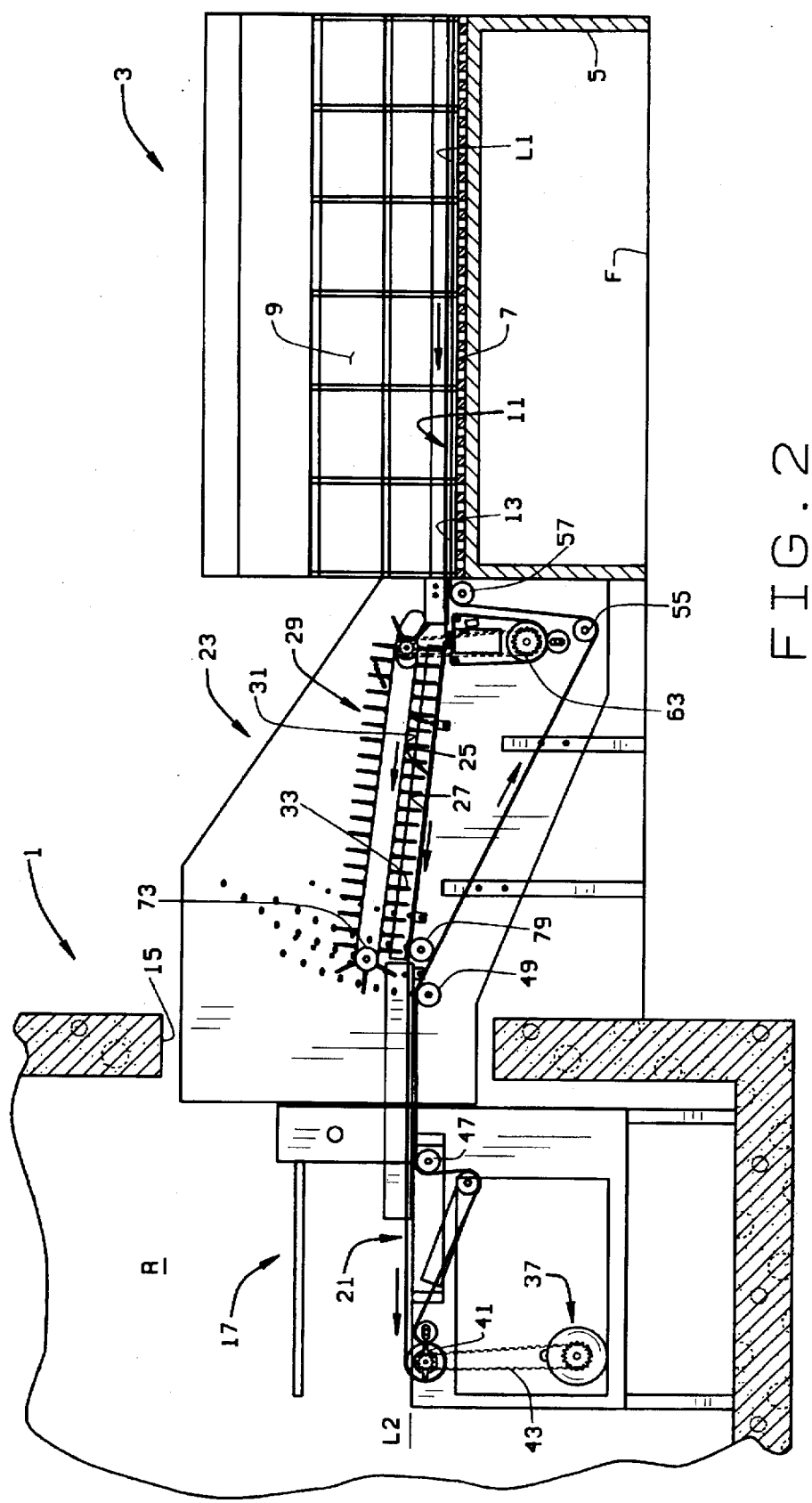
FIG. 2 is a view similar to FIG. 1 in which the egg collection table is located in a pit below the level of the floor of the poultry house with the egg escalator of the present invention being adjusted so as to transfer the eggs through only a slight difference in elevation from one level to another.
Figure 3:
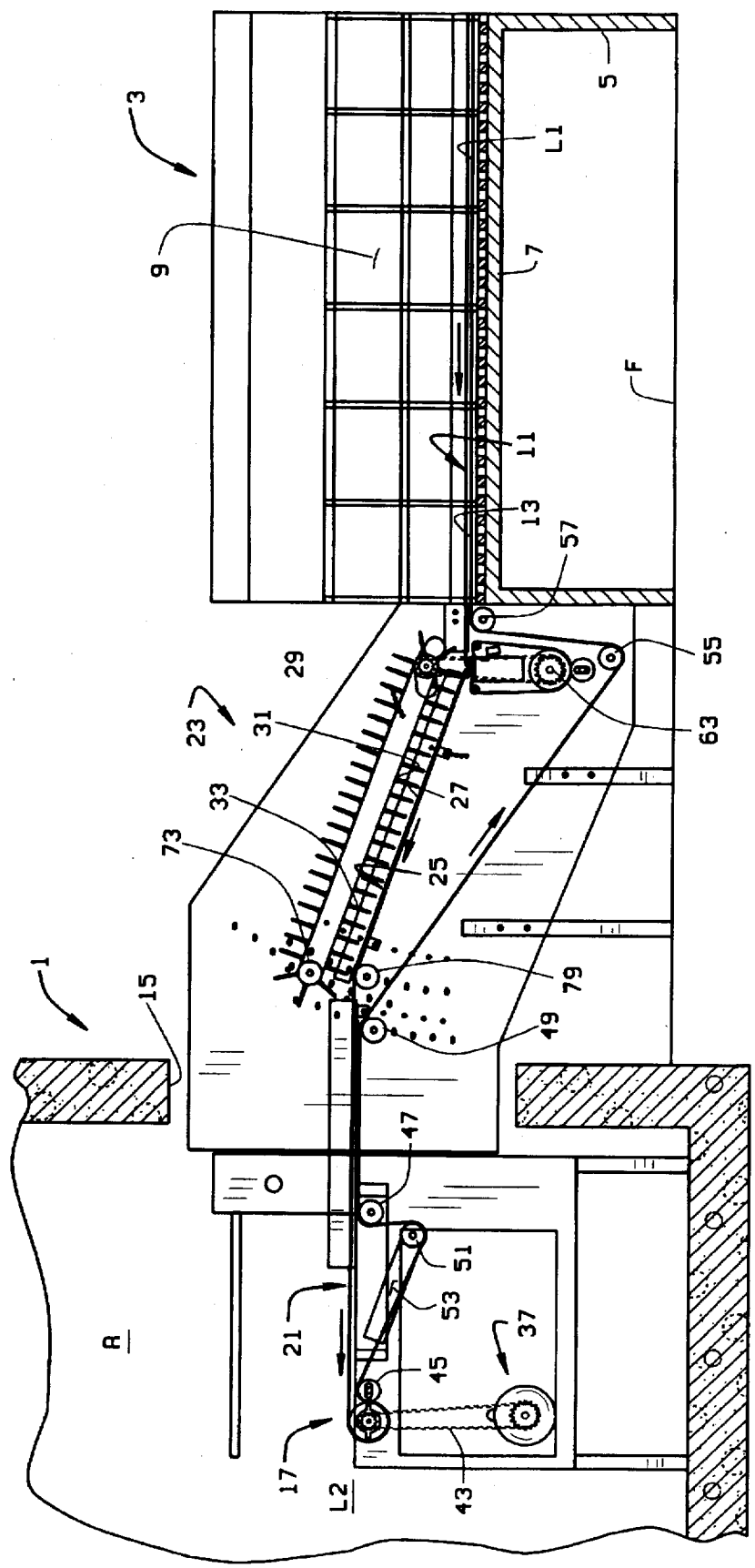
FIG. 3 is a view similar to FIG. 1 with the egg escalator adjusted to lift the eggs to an elevation between the levels of FIGS. 1 and 2.

More specifically, egg collection conveyor 11 has an upper reach 13 which receives the eggs from the nests and which delivers the eggs via an opening 15 in the wall of the poultry house 1 and onto an egg collection table 17 located in an egg collection room R remote from poultry house 1. The height of collection table 17 may be adjusted so that the eggs delivered to the table on an egg delivery conveyor 21 are at a convenient working height such that a person using the collection table may sit or stand comfortably. As shown in FIG. 1, the floor of the egg collection room R may be substantially poultry house 1, or as shown in FIG. 2 the floor of the egg collection room R may be located substantially below the grade of the poultry house floor, or as shown in FIG. 3 the egg collection room floor may be at some intermediate level.

It will be noted in FIG. 1 that the egg collection conveyor 11 is at a first level, as indicated by level L1, and the egg delivery conveyor 21 is at a second level L2. In order to lift (or lower) the eggs from level L1 to level L2, an egg escalator 23 of the present invention is provided. The egg escalator includes an egg escalator belt 25 on which the eggs are supported as they are raised (or lowered) from level L1 to level L2. More specifically, conveyor belt 25 includes an upper reach 27 on which the eggs are supported as they are raised. The egg escalator 23 further comprises a second conveyor, as indicated at 29, which is spaced generally above the level of the upper reach 27 of egg escalator conveyor 25. More specifically, the second conveyor belt 29 has a lower reach 31 which is generally parallel to and is spaced above the upper reach 27 of belt 25. Belt 29 has a plurality of elongate, flexible fingers 33 made of a soft, resilient rubber or the like. It will be understood that the fingers are fixed to the belt so as to extend perpendicularly to the surface of the belt and the fingers are arranged in rows across the width of belt 29. The rows are spaced apart in longitudinal direction along the length of the belt a distance sufficient to accommodate one egg E between adjacent rows. It will be understood that the width of the belt may be such that at least one, and preferably two or more eggs can be simultaneously accommodated across the width of the belt between two adjacent rows of fingers. For example, the fingers 33 in each lateral row of fingers may be spaced from one another about 0.75 inches (1.9 cm.) and the rows may be spaced from one another about 1.75 inches (4.5 cm.). The fingers are preferably about 3 inches (7.6 cm.) long so as to be sufficiently flexible to prevent damage (i.e., breakage or cracking) to the eggs, and yet to provides sufficient stiffness as to prevent the eggs from rolling down the incline of upper reach 27.

Preferably, the lower reach 31 of belt 29 is spaced above upper reach 27 of the egg escalator belt 25 a distance such that the ends of fingers 33 on the lower reach 31 of belt 29 are in close proximity to upper reach 27 of belt 25 (i.e., such that the fingers 33 are nearly touching or are spaced somewhat therefrom). The lower reach 31 of the second belt 29 is driven in the same direction and at the same speed as the upper reach 27 of egg escalator belt 25 such that the finger inhibit eggs E supported from rolling down the incline of upper reach 27.

While the egg collection system has heretofore been described as being comprised by three (3) different conveyors, i.e., egg collection conveyor 21, egg escalator conveyor 25, and egg delivery belt 21, it is preferred that a single conveyor belt, as indicated generally at 35 having three different sections, be used to constitute these three belts. More specifically, a single drive, as is generally indicated at 37, is provided on egg collection table for driving the single conveyor belt 35. This drive comprises variable speed electric motor 39 mounted on the frame of the egg collection table coupled to a drive roller 41 by means of a chain and sprocket drive 43. While drive 43 has been shown as a chain and sprocket drive, those skilled in the art will recognize that other equivalent drives, such as belt and pulley drives, toothed timing belt and sprocket drives, and even direct drives could be used with equal results. The belt 35 is entrained around roller 41 (as shown the belt is enwrapped around about 270° of the roller 41) and is held in firm gripping engagement with roller 41 by means of a spring loaded nip roller 45 to insure that the belt is driven at the speed of the drive roller. The lower reach of belt 35 extends from nip roller 45 to a first idler roller 47 and then extends horizontally to another idler roller 49. A desired level of tension is maintained on the belt by a belt tensioning roller 51 carried on a pivoted arm 53 spring biased in such direction as to take slack out of belt 35 and to maintain a desired tension in the belt.

From idler roller 49, the lower reach of belt 35 angles downwardly to another idler roller 55 adjacent nests 3. The belt is then directed upwardly to a level just below the egg collection conveyor 11 and is entrained around another idler roller 57. The belt then extends to the far end of the nests 3 where it is entrained around another roller (not shown) and at which point the upper reach of belt 35 constitutes the egg collection conveyor 11 which receives the eggs as they are laid in nest 9. The egg collection conveyor (i.e., the upper reach of belt 35 within nests 3) extends in horizontal direction adjacent the nests and its output end extends into the egg escalator 23 so as to transfer eggs carried on the egg collection conveyor to the upper reach of egg escalator belt 25.

Figure 4:
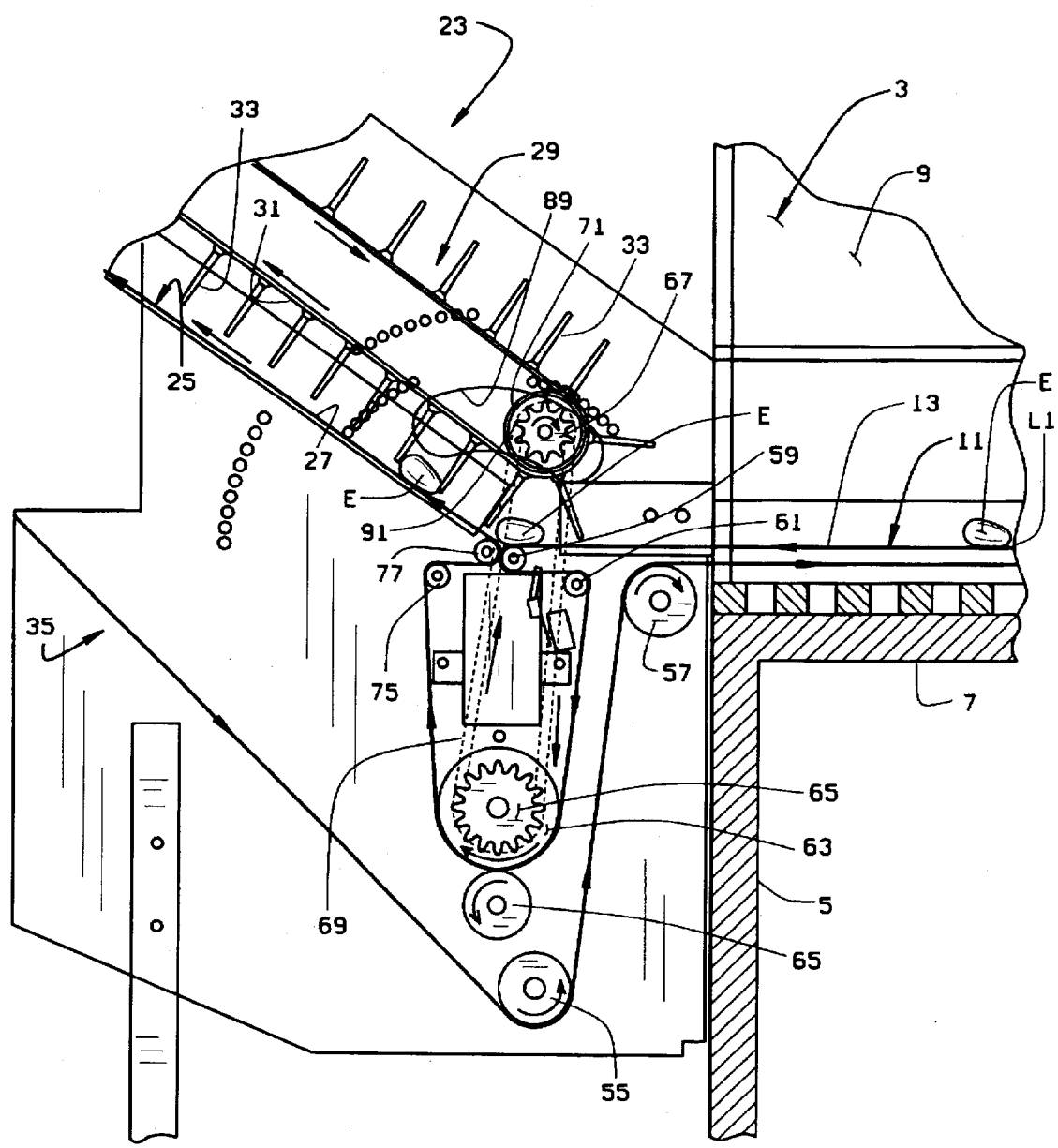
FIG. 4 is an enlarged view taken along line 4—4 of FIG. 1 illustrating the transition between the egg collection conveyor and the egg escalator conveyor and the drive for the egg escalator.

Referring to FIG. 4, it can be seen output end of the egg collection conveyor 11 is defined by a small diameter roller 59 around which belt 35 is entrained. It will be noted that the belt 35 is wrapped around roller 59 approximately 180°. The belt then extends in horizontal direction back below upper reach 13 of the egg collection belt a short distance to another small diameter idler roller 61. The belt 35 then extends downwardly from roller 61 and is enwrapped around a drive roll 63 for driving the second egg escalator belt 29 in a manner as will appear.

Belt 35 is held in firm driving relation with drive roll 63 by means of a spring biased nip roll 65 so as to insure that the drive roll is driven at the same surface speed as belt 35. Drive roll 63 has a chain sprocket 65 which drives a driven sprocket 67 via a chain 69. Drive roller 63, drive sprocket 65, driven sprocket 67 and chain 69 thus constitute the drive for the second escalator or finger belt 29 of the egg escalator. Driven sprocket 67 is part of a drive roller 71 about which belt 29 is enwrapped. The other end of belt 29 is entrained around an idler roller 73. It will be noted that in this manner it is insured that the second egg escalator belt is driven at the same surface speed as belt 35 and that the lower reach 31 of the second egg escalator belt is driven in the same direction (as shown by the arrows in FIG. 4) as the upper reach 27 of the egg escalator belt 25 in the egg escalator.

As the belt leaves drive roller 63, it extends in generally vertical direction and is wrapped around another small diameter idler roller 75. From roller 75, the belt 35 extends in generally horizontal direction a short distance back toward roller 59 to which point the belt is entrained around still another small diameter idler roller 77 from which point the belt extends up the incline of the egg escalator. It will be particularly noted that the outer surfaces of the belt 35 as it is entrained around rollers 59 and 77 are in close proximity to one another and are moving in the same direction so as to facilitate the transfer of eggs supported on the upper surface of the egg collection belt 13 to the upper surface of the upper reach 27 of the egg escalator belt 25. In this manner, eggs E (as shown in FIG. 4) are readily transferred from the egg collection belt 11 to the egg escalator belt 25 with a minimum of change in velocity or direction as the eggs are transferred from the egg collection to the egg escalator belt. It will also be noted that while the eggs are transferred, both the belts are moving in essentially the same direction at the same surface speed so as to further facilitate the transfer of the eggs to the escalator while minimizing the danger that the eggs will be broken or cracked.

Further referring to FIG. 4, it will be appreciated that as eggs E are conveyed on the upper reach 13 of egg collection belt 11 to the egg escalator 23, as the rubber fingers 33 are entrained around drive roller 71, the spacing between the ends of fingers 33 is substantially greater than the spacing between the fingers along reach 31. It will also be appreciated that as the belt 31 is entrained around drive roller 71 that fingers 33 move in the same direction as eggs E conveyed on conveyors 11 and 25 and that until the fingers 33 are fully around roller, the fingers move at an angular velocity greater than the surface speed of the eggs such that the front faces of the fingers tend to sweep any eggs encountered thereby in forward direction as the fingers come around roller 71 and thus move the eggs into the space between the rows of fingers 33 as the eggs are transferred onto egg escalator conveyor 27. If the ends of the fingers would happen to come down on an egg E therebelow just prior to the egg being transferred from the egg collection belt to the egg escalator belt, the fingers 33 are sufficiently flexible that the fingers will not put undue force on the eggs that might crack the eggs. It will be further appreciated that due to the unstable nature of the eggs resting on the moving upper reach 13 of the egg collection belt that the force exerted initially on the eggs has a component in generally horizontal direction that will initially move the eggs in either forward or rearward direction on belt reach 13 such that the egg is not directly under the fingers. In this manner, the eggs on collection belt are separated from one another and the eggs are preventing from being packed into a space between fingers 33 on the egg escalator. As is further shown in FIG. 4, the ends of fingers 33 are spaced a short distance above the upper reach 27 of the egg escalator belt 25, but are sufficiently close to prevent the eggs E from rolling down the incline of the egg escalator belt.

Belt 35 travels along the incline of egg escalator 23 and, as previously mentioned, constitutes the upper reach 27 of the egg escalator belt 25. As shown in FIG. 1, belt as belt 35 exits the egg escalator, it passes over an idler roller 79 which is generally at the level of the egg delivery conveyor 21 which conveys eggs from the egg escalator to the egg collection table 17. In fact, this third section of belt 35 constitutes the previously described egg delivery belt 21. It will be further appreciated that the level of belt 35 as it is entrained around idler roller 79 it level L2 heretofore described.

As previously noted, belt 35 is driven by drive motor 39 and the single belt 35 extends from the egg collection table 17 to the nests 3 where the upper reach of belt 35 constitutes the egg collection conveyor 11, to the egg escalator 23 where the upper reach of belt constitutes egg escalator conveyor 25, to the egg collection table where the upper reach of the belt constitutes the egg delivery conveyor 21. Further, since belt 35 drives the second, fingered egg escalator belt 29 via the drive roller 63 and the chain and sprocket drive 65, 67, 69, it is insured that the egg collection conveyor 11, the egg escalator conveyor 25, the fingered belt 29, and the egg delivery conveyor 21 are driven at substantially the same surface speed. This is important because drive motor 39 is preferably a variable speed drive motor so that the operator at the egg collection table can speed up or slow down the speed of the various belts, depending on the number of eggs to be collected. Because the belt 35 is common to all of the conveyors, there is no need to insure that the timing of the various belts need be adjusted relative to one another if the operator chooses to speed up or to slow down operation of, for example, the egg delivery belt 21. It is insured that all of the various conveyors are driven at the proper speed relative to one another and in the same direction thereby lessening the possibility that eggs E will be broken or cracked as they are collected and delivered to egg collection table 17.

Further in accordance with this invention, egg escalator 23 may be readily set up to convey eggs E between a range of levels between level L1 and level L2, depending on the elevation of the floor of poultry house 1, the floor of the egg collection room where egg collection table 17 is located, and on the desired working height of the egg collection table. As shown best in FIG. 1, the egg escalator 23 is housed within an enclosure 81 having sheet metal sidewalls 81a, 81b. As shown in FIGS. 1–4, the nearside sidewall 81a is broken away so as to illustrate the details of the egg escalator within the sidewalls, but it will be understood that sidewalls 81a and 81b are nearly identical so that what is described in relation to sidewall 81b (which is shown in FIGS. 1–4) also applies to side wall 81a. Generally, egg escalator 23 of the present invention includes means for, upon setting up the escalator in a particular poultry house 1, enabling ready adjustment of the escalator to raise (or lower) eggs E from the level of egg collection conveyor 11 (referred to as level L1) to the level of the egg deliver conveyor 21(referred to as level L2), depending on the height of the nests 3, the height of the nest supports, the grade level of the floor in the poultry house, the desired working level of egg collection table 17 and the grade of the floor within the egg collection room where the table is located. It will also be appreciated that egg escalators 23 or the present invention may also be used to collect eggs from nest at different elevations within the poultry house and to raise or lower the eggs to a common egg collection conveyor system. As noted in FIG. 1, sidewalls 81a, 81b are provided with a first arcuate series of holes 83 arranged in an arc having the centerline of roller 77 as its center. As shown, depending on the desired degree of inclination for the egg escalator, roller 47 which supports the lower reach of belt 35 is located in an appropriate hole 83. Likewise, another arcuate series of holes, as indicated at 85, is provided in sidewalls 81a, 81b for supporting idler roller 79 over which the upper reach of belt 35 is entrained as the belt exits the egg escalator 23, depending on the degree of inclination desired for the egg escalator. It will be appreciated that the location of roller 79 in a respective hole 85 determines the degree of inclination of egg escalator conveyor 35. Still further, a third arcuate series of holes 87 is provided in the sidewalls 81a, 81b for locating roller 73 around which the second or fingered belt 29 is entrained. These arcuate rows of holes 83, 85 and 87 have a common center which is located approximately at the location of roller 77 such that the angle at which the egg escalator conveyor is inclined is generally coincident with roller 77.

As best shown in the enlarged view of FIG. 4, the axis of drive roller 71 for the fingered conveyor belt 29 is mounted in an arc-shaped slot 89 formed in sidewalls 81a, 81b. The ends of roller 71 are mounted in followers 91 which clampingly engage sidewalls 81a, 81b adjacent the edges of slot 89 for securing roller 71 in fixed position relative to the sidewalls. Slot 89 has its center generally coincident with the centerline of roller 77. In this manner, as the angle of inclination of escalator conveyor belt 25 is raised or lowered, the second or fingered belt 29 may also be raised or lowered so as to maintain the fingered belt in substantially parallel relation to the egg escalator belt above the upper reach of the egg escalator belt. Drive roller 63 is adjustably mounted with respect to side walls 81a, 81b such that upon adjusting the inclination of the second belt, the drive wheel 63 may be moved to properly tension chain 69.

In operation, hens lay their eggs in nests 3 and the eggs E roll out of the nests and onto the upper surface of egg collection conveyor 11. At selected times of the day, an operator will turn on drive motor 39 mounted on egg collection table 17 installed in egg collection room R. This in turn drives endless belt 35 in the following manner. From drive wheel 41, the lower reach of belt 35 is entrained around idler rollers 47, 55 and 57. The belt passes immediately below the upper reach thereof which constitutes egg collection conveyor 11 to another idler roller (not shown) at the far end (i.e., the left end) of nests 3. It will be appreciated that drive roller 41 and this end roller (not shown) may be adjusted in angular direction so as to insure that belt 35 tracks straight as the belt is entrained therearound. As the upper reach of belt 35 is conveyed past nest holes 9, it constitutes the upper reach of egg collection belt 11 and conveys the eggs E deposited thereon in generally horizontal direction toward egg escalator 23 in the first horizontal level L1.

As eggs E carried on the egg collection conveyor 11 approach idler roller 59 (as shown in FIG. 4), the rounded end of the eggs encounter in inclined surface of the upper reach 27 of egg escalator conveyor 25. As previously noted, this upper reach 27 of the egg escalator conveyor is constituted by a section of belt 35. Further, drive roller 63 is driven by belt 35 and thus, via chain and sprocket drive 65, 67 and 69, drive the second or fingered belt 29 at generally the same surface speed as the egg escalator belt and in the same inclined direction. Due to the close proximity to the sections of the belt 35 enwrapped around the closely situated rolls 59 and 75, there is only a small gap between the end to the egg collection conveyor and the beginning of the egg escalator belt 25. Also, it will be noted that the outlet end of the egg collection conveyor and the inlet end of the egg escalator conveyor are driven in the same direction and at the same speed. This insures that eggs E are gently transferred from the egg collection conveyor to the egg escalator belt conveyors thereby to reduce the risk of breaking or cracking the eggs E transported thereon. As finger 33 are entrained around the drive wheel 71, the fingers are caused to initially move at a speed somewhat faster than the surface speed on an egg E carried on collector belt such that the eggs are swept in forward direction onto egg escalator belt 25. Again, because the belts 11 and 25 are moving in the same general direction and at substantially the same surface speed (as determined by the speed of drive motor 39) all sections of belt 35 move at substantially the same surface speed. By having all sections of the belt 35 being driven and under the control of a single variable speed electric motor 39, the speed at which eggs are collected can readily controlled by the operator in the egg collection room without the necessity of having to separately regulate the speed of the various conveyor section 11, 25, and 21.

In view of the above, it will be seen that the several objects and features of this invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. An egg escalator for transferring eggs from one level to another level comprising a first conveyor belt having an upper reach inclined at an angle and extending between said one level to said other level, said eggs being capable of resting on said upper reach of said first conveyor belt as they are conveyed from said one level to said other level, and a second belt spaced generally above said upper reach of said first belt, said second belt having a lower reach spaced from said upper reach of said first belt and disposed so as to be substantially parallel to said upper reach of said first belt, said second belt having a multiplicity of elongate, flexible fingers extending perpendicularly outwardly therefrom, said fingers being spaced at substantially equal intervals from one another along said second belt for accommodating an egg between adjacent fingers, said lower reach of said second belt being spaced relative to said upper reach of said first belt such that the ends of said fingers on said reach of said second belt are in close proximity to said upper reach of said fist belt on which said eggs are supported, said upper reach of said first belt and said lower reach of said second belt being driven in the same direction at substantially the same surface speed such that as said upper reach will move eggs from said one level to said other level and said fingers on said second belt will inhibit eggs from rolling down said upper reach of said first belt.

2. An egg escalator as set forth in claim 1 wherein said first belt is adjustable to assume various angles of inclination within a limited range so as to accommodate the transfer of eggs from different levels.

3. In an egg escalator for an nest or cage system in which hens lay eggs, said system having an egg collection conveyor for collecting eggs at one level from said nest system and for delivering said eggs to an egg escalator, and an egg delivery conveyor at another level for receiving eggs from said egg escalator and for delivering said eggs to a collection point, wherein said improvement comprises: an escalator conveyor having an upper reach extending between said one level and said other level, said eggs being, capable of resting on said upper reach of said escalator conveyor as they are conveyed from said one level to said other level, said escalator further comprising an egg retaining belt having a lower reach spaced from said upper reach of said escalator conveyor and disposed so as to be substantially parallel thereto, said egg retaining belt having a multiplicity of elongate, flexible fingers extending perpendicularly outwardly therefrom, said fingers being spaced at substantially equal intervals from one another along said egg retaining belt for accommodating an egg between adjacent fingers with the ends of said fingers being in close proximity to said upper reach of said escalator conveyor on which said eggs are supported, said upper reach of said escalator conveyor and said lower reach of said egg retaining belt being driven in the same direction at substantially the same surface speed such that said fingers on said egg retaining belt will inhibit eggs from rolling down said upper reach of said escalator conveyor, said collection conveyor, said escalator conveyor, and said delivery conveyor being comprised of a single endless belt having a first section constituting said collection conveyor, a second section constituting said escalator conveyor, and a third section constituting said delivery conveyor.

4. In an egg escalator as set forth in claim 3 comprising a single drive for said single endless belt.

5. In an egg escalator as set forth in claim 4 wherein said single drive for said single endless belts is a variable speed motor such that upon changing the speed of said drive said relative speeds of said egg collection conveyor, said first belt, and said delivery conveyor are in synchronization with one another.

6. In an egg escalator as set forth in claim 3 wherein said collection point is an egg collection table for receiving eggs delivered by said egg delivery conveyor, said egg collection table being of a height above the floor on which it rests which is a convenient height to a person using said egg collection table, said egg delivery conveyor being generally horizontal and being generally of the same level as said egg collection table height.

7. In a egg escalator as set forth in claim 3 wherein said egg retaining conveyor is a belt in entrained around rollers at the ends thereof with one of said rollers being positioned proximate the transition between said egg collection conveyor and said escalator conveyor, said fingers when moved around said one roller moving somewhat faster than the surface speed of said egg collection conveyor of said escalator conveyor so as to sweep eggs carried by said egg collection conveyor onto said said upper reach of said escalator conveyor.

8. In an egg escalator as set forth in claim 3 further comprising an adjustment for varying the elevation of said upper reach of said escalator conveyor.

9. In an egg escalator as set forth in claim 8 wherein said egg retaining conveyor is mounted relative to said egg escalator conveyor such that said egg retaining conveyor is maintained in a generally parallel relationship relative to said upper reach of said egg escalator conveyor as the elevation of said escalator conveyor is adjusted from one elevation to another.

10. An egg collection system for a poultry house or the like, said poultry house having nests or cages therein in which hens lay eggs, said eggs being capable of being delivered from said nests onto an egg collection conveyor disposed at a first horizontal level, said collection conveyor being capable of transporting eggs in a generally horizontal direction, a collection point for said eggs at a second level different from said first level, an egg escalator being capable receiving eggs from said collection conveyor and of elevating eggs from said first level to said second level, a delivery conveyor generally at said second level being capable of receiving eggs from said egg escalator conveyor and of delivery of eggs to said collection point, said egg escalator comprising a lower conveyor belt capable of carrying eggs as the eggs are transferred from said first level to said second level and a second conveyor belt disposed generally above and parallel to said first conveyor belt with said second conveyor belt having a plurality of elongate, flexible fingers extending generally perpendicularly therefrom, said second conveyor belt being spaced from said first conveyor belt such that said fingers engage eggs carried on said first conveyor belt as the eggs are elevated from said first level to said second level so as to prevent said eggs from rolling down the incline of said first conveyor belt.

11. An egg collection system as set forth in claim 10 wherein said egg collection conveyor, said first egg escalator conveyor belt, and said egg delivery conveyor are constituted by a common endless belt with a first section of said endless belt constituting said egg collection conveyor, with a second section of said endless belt constituting said first egg escalator belt, and with a third section constituting said egg delivery conveyor, said system further comprising a single drive for said endless belt.

12. An egg collection system comprising nests in which birds may lay eggs which are delivered from said nests onto a first section of an endless conveyor disposed at a first horizontal level, said first section of said conveyor conveying eggs delivered thereto in generally horizontal direction at said first level to an egg escalator section of said endless belt, said escalator section elevating said eggs from said first level to a second level and delivering said eggs to a third section of said endless belt at said second level which delivers said eggs to a collection point generally at said second level, said system comprising a single drive for said endless belt thereby to insure that said first section, said escalator section and said third section of said belt are driven at substantially the same surface speed, said system further comprising another endless belt having a lower reach disposed generally above and parallel to said escalator section, said other endless belt having a plurality of elongate, flexible finger extending therefrom for engagement with eggs supported on said escalator section of said belt and being movable in the same direction as said escalator section of said belt at substantially the same speed as said escalator section of said belt thereby to prevent said eggs from rolling down the incline of said escalator section.

13. An egg collection system as set forth is claim 12 wherein said system further comprises means driven by said endless belt for driving said other endless belt.

14. An egg escalator for conveying egg from a first conveyor at a first level to a second conveyor at a second level, said egg escalator comprising an escalator conveyor having an upper reach extending between said first level to said second level with eggs being capable of resting on said upper reach of said escalator conveyor as they are conveyed from said first level to said second level, said escalator further comprising an egg retaining conveyor spaced generally above said upper reach of said escalator conveyor, said egg retaining conveyor having a lower reach spaced from said upper reach of said escalator conveyor and disposed so as to be substantially parallel to said upper reach of said escalator conveyor, said egg retaining conveyor having a multiplicity of elongate, flexible fingers extending perpendicularly outwardly therefrom, said fingers being spaced at substantially equal intervals from one another along said egg retaining conveyor for accommodating an egg between adjacent fingers, said lower reach of said egg retaining conveyor being spaced relative to said escalator conveyor such that the ends of said fingers are in close proximity to said upper reach of said escalator on which said eggs are supported, said upper reach of said escalator conveyor and said egg retaining conveyor being driven in the same direction at substantially the same surface speed such that as said escalator conveyor will move eggs from said one level to said other level such that said fingers on said egg retaining conveyor will inhibit eggs from rolling down said escalator conveyor, said first conveyor, said escalator conveyor, and said second conveyor being comprised on a single endless belt having a first section constituting said first conveyor, a second section constituting said upper reach of said escalator conveyor, and a third section constituting said second conveyor.

15. In an egg escalator for a nest or cage system in which hens lay eggs, said system having an egg collection conveyor for collecting eggs at one level from said nest system and for delivering said eggs to an egg escalator and an egg delivery conveyor at another level for receiving eggs from said egg escalator and for delivering said eggs to a collection point, wherein said improvement comprises: an escalator conveyor having an upper reach extending between said one level and said other level, said eggs being capable of resting on said upper reach of said escalator conveyor as they are conveyed from said one level to said other level, said escalator further comprising an egg retaining belt having a lower reach spaced from said upper reach of said escalator conveyor and disposed so as to be substantially parallel thereto said egg retaining belt having a multiplicity of elongate, flexible fingers extending perpendicularly outwardly therefrom, said fingers being spaced at substantially equal intervals from one another along said egg retaining belt for accommodating an egg between adjacent fingers with the ends of said fingers being in close proximity to said upper reach of said escalator conveyor on which said eggs are supported, said upper reach of said escalator conveyor and said lower reach of said egg retaining belt being driven in the same direction at substantially the same surface speed such that said fingers on said egg retaining belt will inhibit eggs from rolling down said upper reach of said escalator conveyor, said collection conveyor and said escalator conveyor being comprised of a single endless belt having a first section constituting said escalator conveyor and a second section constituting said escalator conveyor.

16. In an egg escalator for a nest or cage system in which hens lay eggs, said system having an egg collection conveyor for collecting eggs at one level from said nest system and for delivering said eggs to an egg escalator, and an egg delivery conveyor at another level for receiving eggs from said egg escalator and for delivering said eggs to a collection point, wherein said improvement comprises: an escalator conveyor having an upper reach extending between said one level and said other level, said eggs being capable of resting on said upper reach of said escalator conveyor as they are conveyed from said one level to said other level, said escalator further comprising an egg retaining belt having a lower reach spaced for said upper reach of said escalator conveyor and disposed so as to be substantially parallel thereto, said egg retaining belt having a multiplicity of elongate, flexible fingers extending perpendicularly outwardly therefrom, said fingers being spaced at substantially equal intervals from one another along said egg retaining belt for accommodating an egg between adjacent fingers with the ends of said fingers being in close proximity to said upper reach of said escalator conveyor on which said eggs are supported, said upper reach of said escalator conveyor and said lower reach of said egg retaining belt being driven in the same direction at substantially the same surface speed such that said fingers on said egg retaining belt will inhibit eggs from rolling down said upper reach of said escalator conveyor, said escalator conveyor and said delivery conveyor being comprised of a single endless belt having a first section constituting said escalator conveyor and a second section constituting said delivery conveyor.

* * * * *

UNITED STATES PATENT AND TRADEMARK OFFICE
CERTIFICATE OF CORRECTION

PATENT NO : 5,673,649

DATED : October 7, 1997

INVENTOR(S) : Donald D. Duecker et al.

It is certified that error appears in the above-identified patent and that said Letters Patent is hereby corrected as shown below:

On title page, item 57 Abstract
  replace "(27) of the first belt disposed"
  with --(27) of the first belt and disposed--.

On title page, item 57 Abstract
  replace "such that the upper reach"
  with --such that as the upper reach--.

Col. 2, line 22
  replace "left"
  with --lift--.

Col. 2, line 54
  replace "U-shaped shaped"
  with --U-shaped--.

Col. 10, line 32
  replace "fist belt"
  with --first belt--.

Col. 12, line 35
  replace "conveying egg"
  with --conveying eggs--.

Col. 12, line 60
  replace "other level such"
  with --other level and such--.

Signed and Sealed this

Eleventh Day of July, 2000

*Attest:*

Q. TODD DICKINSON

*Attesting Officer*     *Director of Patents and Trademarks*